United States Patent [19]

Sandstrom et al.

[11] Patent Number: 5,336,730

[45] Date of Patent: Aug. 9, 1994

[54] TIRE WITH SILICA REINFORCED TREAD

[75] Inventors: Paul H. Sandstrom, Tallmadge; Richard G. Bauer, Kent; Donald J. Burlett, Wadsworth; Mark S. Sinsky, Akron, all of Ohio

[73] Assignee: The Goodyear Tire & Rubber Company, Akron, Ohio

[21] Appl. No.: 160,718

[22] Filed: Dec. 2, 1993

Related U.S. Application Data

[63] Continuation of Ser. No. 79,191, Jun. 18, 1993, abandoned.

[51] Int. Cl.$^5$ ................................................ C08K 5/54
[52] U.S. Cl. .................... 525/332.6; 152/209 R; 524/262; 524/304; 524/305; 524/492; 524/493; 524/495
[58] Field of Search ............... 524/495, 305, 304, 262; 152/209 R; 525/332.6

[56] References Cited

U.S. PATENT DOCUMENTS

| | | | |
|---|---|---|---|
| 2,602,815 | 7/1952 | Gregory | 524/303 |
| 2,821,232 | 1/1958 | Wolf | 152/330 |
| 3,451,458 | 6/1969 | Stueber | 152/330 |
| 3,479,311 | 11/1969 | Gorman et al. | 524/305 |
| 3,664,403 | 5/1972 | Doran et al. | 152/330 |
| 3,768,537 | 10/1973 | Hess et al. | 152/330 |
| 3,821,133 | 6/1974 | Doran et al. | 152/330 |
| 3,873,489 | 3/1975 | Thurn et al. | 260/33.6 |
| 3,884,285 | 5/1975 | Russell et al. | 152/330 |
| 3,938,574 | 2/1976 | Burmester et al. | 152/330 |
| 3,994,742 | 11/1976 | Russell et al. | 106/288 |
| 4,010,129 | 3/1977 | Aron | 524/305 |
| 4,076,550 | 2/1978 | Thurn et al. | 106/288 |
| 4,162,354 | 7/1979 | Pearson et al. | 524/305 |
| 4,203,874 | 5/1980 | Halasa et al. | 525/349 |
| 4,278,587 | 7/1981 | Wolff et al. | 260/42.37 |
| 4,482,663 | 11/1984 | Kraus | 524/99 |
| 4,513,123 | 4/1985 | Day et al. | 525/332.6 |
| 4,517,336 | 5/1985 | Wolff et al. | 524/262 |
| 4,519,430 | 5/1985 | Ahmad et al. | 152/209 |
| 4,590,052 | 5/1986 | Chevallier et al. | 423/335 |
| 4,595,721 | 6/1986 | Devaux et al. | 524/304 |
| 4,900,772 | 2/1990 | Imanaka et al. | 524/304 |
| 5,087,668 | 2/1992 | Sandstrom et al. | 525/237 |
| 5,089,554 | 2/1992 | Bomo et al. | 524/493 |
| 5,102,409 | 11/1992 | Mrockowski | 524/262 |
| 5,225,011 | 7/1993 | Takino et al. | 152/209 R |
| 5,227,425 | 7/1993 | Rauline | 524/493 |

FOREIGN PATENT DOCUMENTS 1424503 3/1974 United Kingdom .

*Primary Examiner*—Veronica P. Hoke
*Attorney, Agent, or Firm*—Henry C. Young, Jr.

[57] ABSTRACT

A pneumatic tire with a tread comprised of elastomer, silica, optionally carbon black, and a silica coupler comprised of dithiodipropionic acid.

16 Claims, No Drawings

5,336,730

TIRE WITH SILICA REINFORCED TREAD

This is a continuation of application Ser. No. 08/097,191, filed on Jun. 18, 1993, now abandoned.

FIELD

This invention relates to tires reinforced with silica and particularly to tires with treads which are tires having rubber treads which are quantitatively reinforced with silica. In one aspect, the tread is comprised of rubber, particularly sulfur cured rubber, reinforced with a combination of silica and specified coupling agent and, optionally, carbon black.

BACKGROUND

Pneumatic rubber tires are conventionally prepared with a rubber tread which can be a blend of various rubbers which is typically reinforced with carbon black.

In one aspect, rubbers are evaluated, selected and blended for a purpose of achieving desired tire tread properties and particularly a balance of tire tread characteristic properties, mainly, rolling resistance, traction and wear.

For various applications utilizing rubber which requires high strength and abrasion resistance, particularly applications such as tires and various industrial products, sulfur cured rubber is utilized which contains substantial amounts of reinforcing fillers. Carbon black is commonly used for such purpose and normally provides or enhances good physical properties for the sulfur cured rubber. Particulate silica is also often used for such purpose, particularly when the silica is used in conjunction with a coupling agent. In some cases, a combination of silica and carbon black is utilized for reinforcing fillers for various rubber products, including treads for tires.

It is important to appreciate that, conventionally, carbon black is a considerably more effective reinforcing filler for rubber products, and particularly for rubber tire treads than silica if the silica is used without a coupling agent, or silica coupler as it may be sometimes referred to herein.

Indeed, at least as compared to carbon black, there tends to be a lack of, or at least an insufficient degree of, physical and/or chemical bonding between the silica particles and the rubber elastomers to enable the silica to become a sufficient reinforcing filler for the rubber for most purposes, including tire treads, if the silica is used without a coupler. While various treatments and procedures have been devised to overcome such deficiencies compounds capable of reacting with both the silica surface and the rubber elastomer molecule, generally known to those skilled in such art as coupling agents, are often used. Such coupling agents may, for example, be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents are generally composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface, possibly through hydrolysis, and the rubber reactive component of the coupling agent combines with the rubber itself. Usually the rubber reactive component of the coupler is temperature sensitive and tends to combine with the rubber during the final and higher temperature sulfur vulcanization stage and, thus, subsequent to the rubber/silica/coupler mixing stage and, therefore, after the silane group of the coupler has combined with the silica. However, partly because of typical temperature sensitivity of the coupler, some degree of combination, or bonding, may occur between the rubber-reactive component of the coupler and the rubber during an initial rubber/silica/coupler mixing stages and, thus, prior to a subsequent vulcanization stage.

The rubber-reactive group component of the coupler may be, for example, one or more of groups such as mercapto, amino, vinyl, epoxy, and sulfur groups, preferably a sulfur or mercapto moiety and more preferably sulfur.

Numerous coupling agents are taught for use in combining silica and rubber, such as, for example, silane coupling agents containing a polysulfide component, or structure, such as bis-(3-triethoxysilylpropyl)tetrasulfide and/or polyisoprene rubber together with a mixture of silica and carbon black, with silica being required to be a major component of the silica/carbon black reinforcing filler.

Other U.S. patents relating to silicas and silica reinforced tire treads include U.S. Pat. Nos. 3,451,458; 3,664,403; 3,768,537; 3,884,285; 3,938,574; 4,482,663; 4,590,052; 5,089,554 and British 1,424,503.

U.S. Pat. No. 4,513,123 discloses a rubber composition of dithiodipropionic acid with natural rubber, or blends of natural and synthetic rubbers, 30–80 parts carbon black, sulfur and organo-cobalt compound for use as a skim coat for brass-plated steel. It relates that the rubber composition can contain other additives such as fillers such as clays, silicas or calcium carbonate, process and extender oils, antioxidants, cure accelerators, cure activators, cure stabilizers and the like.

SUMMARY AND PRACTICE OF THE INVENTION

In accordance with this invention, a pneumatic tire is provided having a tread comprised of (A) 100 parts by weight of at least one diene-based elastomer, (B) about 5 to about 90, optionally about 25 to about 90, phr particulate silica, (C) about zero to about 80, optionally up to about 30, phr carbon black, and (D) a silica coupler selected from (i) dithiodipropionic acid or from (ii) a combination of about 95 to about 25, preferably about 95 to about 55, weight percent dithiodipropionic acid and, correspondingly, about 5 to about 75, preferably about 5 to about 45, weight percent bis-(3-triethoxysilylpropyl)tetrasulfide; wherein the weight ratio of said silica coupler to silica is in a range of about 0.01/1 to about 0.2/1; wherein the weight ratio of silica to carbon black, where said tread contains carbon black, is at least 0.1/1, optionally at least 3/1 and optionally at least 10/1; wherein the total of silica and carbon black, where said tread contains carbon black, is in a range of about 30 to about 120, more preferably about 45 to about 90.

Thus, in one aspect of the invention, the tread rubber contains a combination of both silica and carbon black as elastomer reinforcing pigments, although the tread rubber can contain silica as an exclusive reinforcing pigment.

Where the tread rubber composition contains both silica and carbon black pigments and it is desired that the tread be primarily reinforced with silica as the reinforcing pigment, it is preferable that the weight ratio of silica to carbon black, where carbon black is used, is at least 3/1, preferably at least 10/1 and preferably in a range of about 3/1 to about 30/1.

In one aspect of the invention, the silica coupler in the tire tread rubber composition consists essentially of the dithiodipropionic acid. While dithiodipropionic acid exists in isomer forms, such as the 3,3'- and 2,2'-forms, the 3,3'-dithiodipropionic acid form is preferred.

In one aspect, such a tire is provided with the tread being sulfur cured. The sulfur curing is accomplished in a conventional manner, namely by curing under conditions of elevated temperature and pressure for a suitable period of time.

In another aspect of the invention, it is contemplated, and indeed preferred, that the tread rubber composition is exclusive of any organo-cobalt compound.

The term "phr" as used herein, and according to conventional practice, refers to "parts of a respective material per 100 parts by weight of rubber, or elastomer".

In the description of this invention, the terms "rubber" and "elastomer" can be used interchangeably, unless otherwise distinguished. The terms "rubber composition", "compounded rubber" and "rubber compound" can be used interchangeably to refer to rubber which has been blended or mixed with various ingredients and materials and such terms are well known to those having skill in the rubber mixing or rubber compounding art.

The dithiodipropionic acid may typically be characterized by having melting point in the range from 153°–159° C. Such melting point can conveniently be determined by a differential scanning calorimeter at a heating rate of 10° C./minute.

In the practice of this invention, as hereinbefore pointed out, the tread rubber composition is comprised of at least one diene-based elastomer, or rubber. Thus, it is considered that the elastomer is a sulfur curable elastomer. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, butadiene/acrylonitrile copolymer rubbers, styrene/isoprene/butadiene terpolymer rubbers, and cis 1,4-polybutadiene rubber.

In one aspect the rubber is preferably of at least two of diene based rubbers. For example a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S - SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition.

The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear.

Such BR can be prepared, for example, by organic solution polymerization of 1,3-butadiene.

The BR may be conveniently characterized, for example, by having at least a 90% cis 1,4-content.

The cis 1,4-polyisoprene and cis 1,4-polyisoprene natural rubber are well known to those having skill in the rubber art.

The vulcanized rubber tread should contain a sufficient amount of silica, and carbon black if used, as reinforcing filler(s) to contribute a reasonably high modulus and high resistance to tear. The combined weight of the silica and carbon black, as hereinbefore referenced, may be as low as about 30 parts per 100 parts rubber, but is preferably from about 45 to about 90 parts by weight.

The commonly employed siliceous pigments used in rubber compounding applications can be used as the silica in this invention, including pyrogenic and precipitated siliceous pigments (silica), although precipitate silicas are preferred.

The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR, silicas available from Degussa AG with, for example, designations VN2 and VN3, and silicas from Akzo Chemical, etc. The PPG Hi-Sil silicas are currently preferred.

It is readily understood by those having skill in the art that the rubber composition and the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of reinforcing type carbon blacks(s), for this invention, if used, are hereinbefore set forth. It is to be appreciated that the silica coupler may be used in conjunction with a carbon black, namely pre-mixed with a carbon black prior to addition to the rubber composition, and such carbon black is to be included in the aforesaid amount of carbon black for the rubber composition formulation. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344-346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often micro-crystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with dithiodipropionic acid as a coupling agent. The presence and relative amounts of the above additives are not considered to be an aspect of the present invention which is more primarily directed to the utilization of specified blends of rubbers in tire treads, in combination with silica and dithiodipropionic acid, or blends of dithiodipropionic acid and bis-(3-triethoxysilylpropyl)tetrasulfide as well as, optionally, carbon black, for the reinforcement of the rubber.

The mixing of the rubber composition can be accomplished by methods known to those having skill in the rubber mixing art. For example the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, silica and silica coupler, and carbon black if used, are mixed in one or more non-productive mix stages. The terms "non-productive" and "productive" mix stages are well known to those having skill in the rubber mixing art.

The tire can be built, shaped, molded and cured by various methods which are known and will be readily apparent to those having skill in such art.

The invention may be better understood by reference to the following examples in which the parts and percentages are by weight unless otherwise indicated.

EXAMPLE I

In this example, 3,3'-dithiodipropionic acid is evaluated as an alternative for a commonly used silica coupling agent, bis-(3-triethoxysilylpropyl) tetrasulfide, in a silica reinforced rubber composition. Rubber compositions containing the materials set out in Tables 1 and 2 were prepared in a BR Banbury mixer using three separate stages of addition (mixing), namely, two non-productive mix stages and one productive mix stage to temperatures of 160° C., 160° C. and 120° C. and times of 4 minutes, 4 minutes and 2 minutes, respectively. The amount of coupler is listed as being "variable" in Table 1 and is more specifically set forth in Table 2.

The rubber compositions are identified herein as Samples X, Y and Z, with Samples Y and Z utilizing the silica couplers, respectively, and Sample X considered herein as being a control without the use of a silica coupler.

The Samples were cured at about 150° C for about 36 minutes.

Table 2 illustrates the behavior and physical properties of the cured Samples X, Y and Z.

It is clearly evident from the results that a coupling agent is required (Samples Y and Z) to obtain suitable cured properties in a silica containing rubber compound. Such properties include tensile strength at break, the 100 and 300% modulus values, rebound, hardness and Rheovibron E' and tan delta values.

The dithiodipropionic acid used as a silica coupler (Sample Z) is observed to provide larger improvements in these properties than a conventional bis-(3-triethoxysilylpropyl)tetrasulfide silica coupling agent (Sample Y).

This is considered an advantage because it is shown that rubber properties equivalent to the silane coupler might be achieved with less dithiodipropionic acid and potential lower cost. Thus, the dithiodipropionic acid is considered herein to be a suitable alternative for bis-(3-triethoxysilylpropyl) tetrasulfide as a silica coupling agent in a silica reinforced rubber composition.

TABLE 1

| 1st Non-Productive | |
|---|---|
| Natural Rubber[1] | 100.00 |
| Carbon Black | 35.00 |
| Processing Oil | 5.00 |
| Zinc Oxide | 5.00 |
| Fatty Acid | 2.00 |
| Antioxidant[2] | 2.00 |
| 2nd Non-Productive | |
| Silica[3] | 15.00 |
| Bis-(3-triethoxylsilylpropyl) tetrasulfide[4] | variable |
| 3,3'-Dithiodipropionic Acid | variable |
| Productive | |
| Sulfur | 1.40 |
| Accelerator, sulfenamide type | 1.00 |

[1]natural rubber (cis 1,4-polyisoprene);
[2]of the polymerized 1,2-dihydro-2,2,4-trimethyldihydroquinoline type;
[3]Silica obtained as Hi-Sil-210 from PPG Industries, Inc.;
[4]obtained as bis-(3-triethoxysilylpropyl)tetrasulfide, commercially available as Si69 from Degussa

TABLE 2

| Sample # | X | Y | Z |
|---|---|---|---|
| Bis-(3-triethoxysilylpropyl) tetrasulfide (50% active) | 0 | 3.0 | 0 |
| 3,3'-Dithiodipropionic Acid | 0 | 0 | 1.5 |
| Rheometer (150° C.) | | | |
| Max. Torque | 30.8 | 35.6 | 40.7 |
| Min. Torque | 7.0 | 6.4 | 7.0 |
| Delta Torque | 23.8 | 29.2 | 33.7 |
| $T_{90}$, minutes | 23.0 | 19.5 | 28.0 |
| $T_{25}$, minutes | 17.3 | 13.3 | 14.5 |
| Stress-Strain | | | |
| Tensile Strength, MPa | 15.8 | 18.8 | 20.4 |
| Elongation at Break, % | 635 | 574 | 551 |
| 100% Modulus, MPa | 1.11 | 1.76 | 2.26 |
| 300% Modulus, MPa | 4.89 | 8.35 | 9.65 |
| Rebound | | | |
| 100° C., % | 46.8 | 54.6 | 60.3 |
| Hardness | | | |
| 100° C. | 55.3 | 59.6 | 61.5 |
| Rheovibron | | | |
| E' at 60° C., MPa | 10.1 | 13.0 | 17.6 |
| Tan Delta at 60° C. | .106 | .103 | .071 |

EXAMPLE II

Rubber compositions, identified herein as Sample A and Sample B, containing the materials shown in Table 3 were prepared in a BR Banbury mixer using four separate stages of addition, namely, three successive non-productive mix stages followed by a productive mix stage to temperatures of 160° C., 160° C., 160° C. and 120° C. and times of 4, 4, 4, and 2 minutes, respectively.

The Samples contained 80 parts silica and 5 parts carbon black.

The Samples were cured at a temperature of about 150° C. for about 36 minutes.

Sample A is considered a control without a silica coupler and Sample B utilizes dithiodipropionic acid as a silica coupler.

Table 4 shows the cure behavior and physical properties of the cured Samples.

It is clearly evident that the rubber composition (compound) containing the dithiodipropionic acid silica coupler (Sample B) generated a much higher delta torque and also that it had a much higher Shore A hardness.

This is considered an advantage because higher rubber stiffness can be achieved with relatively equal amounts of dithiodipropionic acid or the tetrasulfide/silane coupler or relatively equal stiffness can be achieved at lower dithiodipropionic acid levels than the tetrasulfide/silane coupler.

TABLE 3

| | Sample A | Sample B |
|---|---|---|
| 1st Non-Productive | | |
| Natural Rubber | 100.0 | 100.0 |
| Silica | 45.0 | 45.0 |

TABLE 3-continued

|  | Sample A | Sample B |
|---|---|---|
| Dithiodipropionic Acid | 0 | 4.0 |
| Zinc Oxide | 5.0 | 5.0 |
| Fatty Acid | 4.0 | 4.0 |
| Zinc Carbonate | 3.0 | 3.0 |
| Carbon Black | 5.0 | 5.0 |
| Antioxidant | 2.0 | 2.0 |
| 2nd Non-Productive | | |
| Silica | 20.0 | 20.0 |
| Zinc Carbonate | 1.0 | 1.0 |
| Processing Oil | 5.0 | 5.0 |
| 3rd Non-Productive | | |
| Silica | 15.0 | 15.0 |
| Processing Oil | 5.0 | 5.0 |
| Productive | | |
| Sulfur | 1.5 | 1.5 |
| Accelerators, of the sulfenamide and guanidine type | 3.5 | 3.5 |

TABLE 4

|  | Sample A | Sample B |
|---|---|---|
| 3,3'-Dithiodipropionic Acid | 0 | 4.0 |
| Rheometer (150° C.) | | |
| Max. Torque | 45.8 | 47.8 |
| Min. Torque | 25.2 | 14.0 |
| Delta Torque | 20.6 | 33.8 |
| $T_{90}$, minutes | 24.4 | 30.0 |
| $T_{25}$, minutes | 13.9 | 23.5 |
| Shore A Hardness | | |
| Room Temperature | 69 | 78 |

EXAMPLE III

In this example a combination of both bis-(3-triethoxysilylpropyl tetrasulfide and dithiodipropionic acid are used as coupling agents in a rubber compound containing silica and carbon black (Table 5).

The rubber compositions are referred to herein as Sample C as a control using the dithiodipropionic acid as the silica coupler and Sample D using both the dithiodipropionic acid and the bis-(3-triethoxysilylpropyl)-tetrasulfide as a combination of silica couplers.

The rubber compositions were prepared by mixing the ingredients in two non-productive and one productive mix stage to temperatures of about 160° C., 160° C. and 120° C. and times of about 4, 4, and 2 minutes, respectively.

The Samples were cured at a temperature of about 150° C. for about 36 minutes.

Cure behavior and cured properties for Sample C and Sample D are shown in Table 6. The combination of silica couplers is observed to provide higher stiffness in cured rubber properties and also lower minimum torque for the compounded rubber by the Monsanto rheometer test. The lower minimum torque for the combination of silica couplers, Sample D, verses the compound (rubber composition) containing dithiodipropionic acid, Sample C, suggests the combination might provide better processing as a result of lower compound viscosity.

Thus, the combination of dithiodipropionic acid/tetrasulfide-silane couplers may be considered an advantage in some situations because of improved processing during calendering milling or extrusion of the rubber composition because of a lower rubber composition viscosity.

TABLE 5

| 1st Non-Productive | |
|---|---|
| Natural Rubber | 100.00 |
| Carbon Black | 35.00 |
| Processing Oil | 5.00 |
| Zinc Oxide | 5.00 |
| Fatty Acid | 2.00 |
| Antioxidant | 2.00 |
| 2nd Non-Productive | |
| Silica | 15.00 |
| bis-(3-triethoxysilyl-propyl)tetrasulfide (50% active) | 0 or 3.0 |
| Dithiodipropionic Acid | 0 or 1.0 |
| Productive | |
| Sulfur | 1.40 |
| Accelerator of the Sulfenamide type | 1.0 |

TABLE 6

| Sample # | C | D |
|---|---|---|
| bis-(3-triethoxysilyl-propyl)tetrasulfide (50% active) | 0 | 3.0 |
| 3,3'-Dithiodipropionic Acid | 1.0 | 1.0 |
| Rheometer (150° C.) | | |
| Max. Torque | 42.7 | 43.3 |
| Min. Torque | 8.0 | 7.0 |
| Delta Torque | 34.7 | 36.3 |
| $T_{90}$, minutes | 24.5 | 25.5 |
| Stress-Strain | | |
| Tensile Strength, MPa | 21.0 | 22.1 |
| Elongation at Break, % | 555 | 555 |
| 100% Modulus, MPa | 2.23 | 2.46 |
| 300% Modulus, MPa | 9.78 | 11.06 |
| Rebound | | |
| 100° C., % | 63.4 | 62.0 |
| Hardness | | |
| 100° C. | 58.6 | 60.3 |
| Rheovibron | | |
| E' at 60° C., MPa | 17.2 | 19.3 |
| Tan Delta at 60° C. | .064 | .071 |

EXAMPLE IV

Pneumatic rubber tires are prepared as steel belted radial ply tires, which have sulfur cured rubber treads of this invention.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a tread comprised of (A) 100 parts by weight of at least one diene-based elastomer, (B) about 5 to about 90 phr particulate silica, (C) about zero to about 80 phr carbon black, and (D) a silica coupler selected from (i) dithiodipropionic acid or from (ii) about 95 to about 25 weight percent dithiodipropionic acid and, correspondingly, about 5 to about 75 weight percent bis-(3-triethoxysilylpropyl)tetrasulfide; wherein the weight ratio of said silica coupler to silica is in a range of about 0.01/1 to about 0.2/1; wherein the weight ratio of silica to carbon black, if the tread contains carbon black, is at least about 0.1/1 and where the total of silica and carbon black, if the tread contains carbon black, is in a range of about 30 to about 120.

2. The tire of claim 1 wherein, for the tire tread, the silica coupler consists essentially of dithiodipropionic acid.

3. The tire of claim 1 wherein, for the tire tread, the silica coupler consists essentially of 3,3'-dithiodipropionic acid.

4. The tire of claim 1 wherein, in the tire tread, the silica coupler is a combination of about 95 to about 25 weight percent dithiodipropionic acid and, correspondingly, about 5 to about 75 weight percent bis-(3-triethoxysilylpropyl)tetrasulfide.

5. The tire of claim 4 where said dithiodipropionic acid is 3,3'-dithiodipropionic acid.

6. The tire of claim 1 wherein, in the tire tread, the diene based elastomer is selected from at least one of cis 1,4-polyisoprene rubber, 3,4-polyisoprene rubber, styrene/butadiene copolymer rubbers, styrene/isoprene/butadiene terpolymer rubbers, cis 1,4-polybutadiene rubber, and emulsion polymerization prepared styrene/butadiene/acrylonitrile terpolymer rubber and butadiene/acrylonitrile copolymer rubber.

7. The tire of claim 3, wherein, for the tire tread, the elastomer is at least two diene based rubbers selected from at least two of cis 1,4-polyisoprene natural rubber, 3,4-polyisoprene rubber, styrene/isoprene/butadiene rubber, emulsion and solution polymerization derived styrene/butadiene rubbers and cis 1,4-polybutadiene rubbers.

8. The tire of claim 4, wherein, in the tire tread, the diene based elastomer is selected from at least one of cis 1,4-polyisoprene rubber, 3,4-polyisoprene rubber, styrene/butadiene copolymer rubbers, styrene/isoprene/butadiene terpolymer rubbers, cis 1,4-polybutadiene rubber, and emulsion polymerization prepared styrene/butadiene/acrylonitrile terpolymer rubber and butadiene/acrylonitrile copolymer rubber.

9. The tire of claim 5, wherein, for the tire tread, the elastomer is at least two diene based rubbers selected from at least two of cis 1,4-polyisoprene natural rubber, 3,4-polyisoprene rubber, styrene/isoprene/butadiene rubber, emulsion and solution polymerization derived styrene/butadiene rubbers cis 1,4-polybutadiene rubbers, and emulsion polymerization prepared styrene/butadiene/acrylonitrile terpolymer rubber and butadiene/acrylonitrile copolymer rubber.

10. The tire of claim 7, wherein, for the tire tread, the emulsion polymerization styrene/butadiene (E-SBR) has a bound styrene content in a range of about 30 to about 45 percent.

11. The tire of claim 9, wherein, for the tire tread, the emulsion polymerization styrene/butadiene (E-SBR) has a bound styrene content in a range of about 30 to about 45 percent.

12. The tire of claim 1 wherein, for the tread, the silica is characterized by having a BET surface area in a range of about 50 to about 300 square meters per gram and a dibutylphthalate (DBP) absorption value in a range of about 150 to about 300; and where the tread is exclusive of any organo-cobalt compound.

13. The tire of claim 3 wherein, for the tread, the silica is characterized by having a BET surface area in a range of about 50 to about 300 square meters per gram and a dibutylphthalate (DBP) absorption value in a range of about 150 to about 300; and where the tread is exclusive of any organo-cobalt compound.

14. The tire of claim 4 wherein, for the tread, the silica is characterized by having a BET surface area in a range of about 50 to about 300 square meters per gram and a dibutylphthalate (DBP) absorption value in a range of about 150 to about 300; and where the tread is exclusive of any organo-cobalt compound.

15. The tire of claim 7 wherein, for the tread, the silica is characterized by having a BET surface area in a range of about 50 to about 300 square meters per gram and a dibutylphthalate (DBP) absorption value in a range of about 150 to about 300; and where the tread is exclusive of any organo-cobalt compound.

16. A pneumatic tire having a tread comprised of (A) 100 parts by weight of at least one diene-based elastomer, (B) about 25 to about 90 phr particulate silica, (C) up to about 30 phr carbon black, and (D) a silica coupler selected from (i) 3,3-dithiodipropionic acid or from (ii) about 95 to about 55 weight percent 3,3-dithiodipropionic acid and, correspondingly, about 5 to about 45 weight percent bis-(3-triethoxysilylpropyl)tetrasulfide; wherein the weight ratio of said silica coupler to silica is in a range of about 0.01/1 to about 0.2/1; wherein the weight ratio of silica to carbon black is in a range of about 3/1 to about 30/1; wherein the total of silica and carbon black is in a range of about 30 to about 120; wherein the silica is characterized by having a BET surface area in a range of about 50 to about 300 square meters per gram and a dibutylphthalate (DBP) absorption value in a range of about 150 to about 300; and wherein the tread is exclusive of any organo-cobalt compound.

* * * * *